Nov. 8, 1927. 1,648,142
R. MATTEUCCI
PLANETARY GEAR
Filed July 15, 1926 3 Sheets-Sheet 1

Inventor:
R. Matteucci,
by Langner, Parry, Card & Langner
Attys.

Nov. 8, 1927. 1,648,142
R. MATTEUCCI
PLANETARY GEAR
Filed July 15, 1926 3 Sheets-Sheet 2

Inventor:
R. Matteucci,
by Langner, Parry, Card
& Langner
Attys.

Nov. 8, 1927. 1,648,142
R. MATTEUCCI
PLANETARY GEAR
Filed July 15, 1926   3 Sheets-Sheet 3
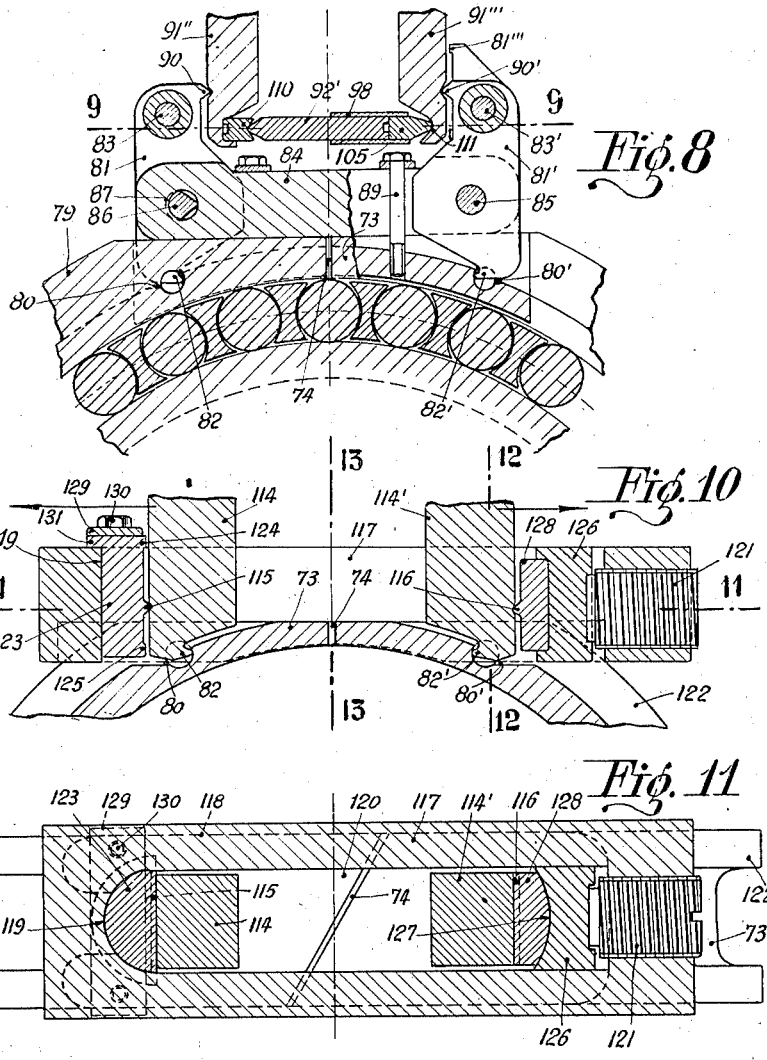
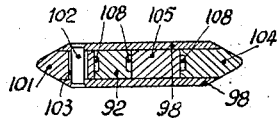
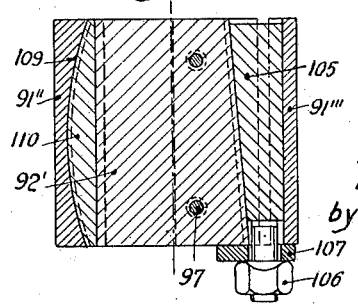
Inventor:
R. Matteucci,
by Langner, Parry,
Card & Langner
Attys.
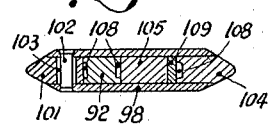

Patented Nov. 8, 1927.

1,648,142

UNITED STATES PATENT OFFICE.

RAFFAELE MATTEUCCI, OF TURIN, ITALY.

PLANETARY GEAR.

Application filed July 15, 1926, Serial No. 122,657, and in Italy July 25, 1925.

The present invention relates to planetary gears transmitting motion by action of adhesion, of the kind comprising a rotary rim solid with one of the two transmission shafts, a stationary member consisting of a split ring and a set of satellite rollers rolling intermediate said rim and ring on tracks of the same and engaged in a carrier which is solid with the other transmission shaft.

The present invention has for its object means for exerting on the ends of said split ring the required action to force it on said satellite rollers with a controlled pressure securing the requisite adhesion of satellite rollers on their tracks, said pressure being distributed in an even and uniform manner on the entire extent of contact lines of each satellite roller with its tracks.

The present invention fully complies with all requirements in respect of the construction of planetary gears both in case of light constructions as for aircraft engines, and in the case of heavier constructions as for steam-turbine speed-reducers, being possible to produce the required action on the ends of the split ring without producing objectionable secondary stresses, and to secure the essential feature of obtaining an even and uniform distribution of rolling pressure along the contact lines of each satellite roller with its tracks, in spite of inaccuracies in construction of the pressure regulating device.

On the annexed drawings are shown by way of example some embodiments of the present invention, and Figure 1 is a transverse section of the entire planetary gear for purpose of illustration;

Figure 3 is a longitudinal section;

Figure 7 is a transverse section of the member shown in Figure 6;

Figure 8 is a fragmentary section of a modification of the gear and

Figure 9 is the section of a detail of the same on line 9—9 of Fig. 8;

Figure 10 is a fragmentary transverse section of a further modification;

Figure 11 is a plan section on line 11—11 of Figure 10;

Figures 1, 12, 13:
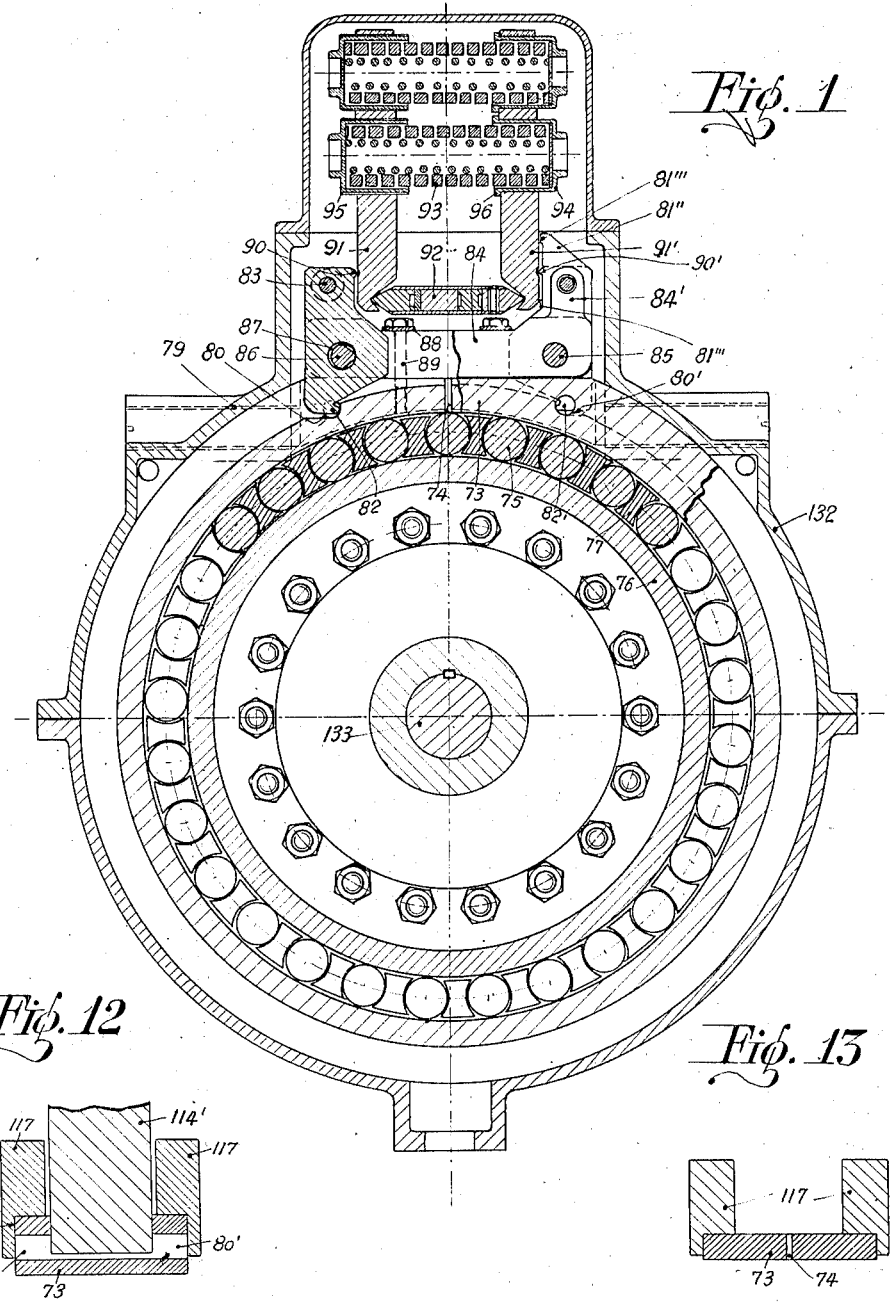
Figure 12 is a section on line 12—12 of Fig. 10.
Figure 13 is a section on line 13—13 of Fig. 10.

In the gear exemplified in Fig. 1, which by way of example is assumed to be a speed-reducer, the planetary gear comprises a ring 73 arranged in a stationary casing 132 and having a slanting slot 74, and rollers 75 running on the inner track of said ring and forced by the same ring on the track of the rim 76 (Fig. 3) which is actuated by the driving shaft 133 thus driving in rotation the roller carrier 77, in the known manner.

Figure 2:
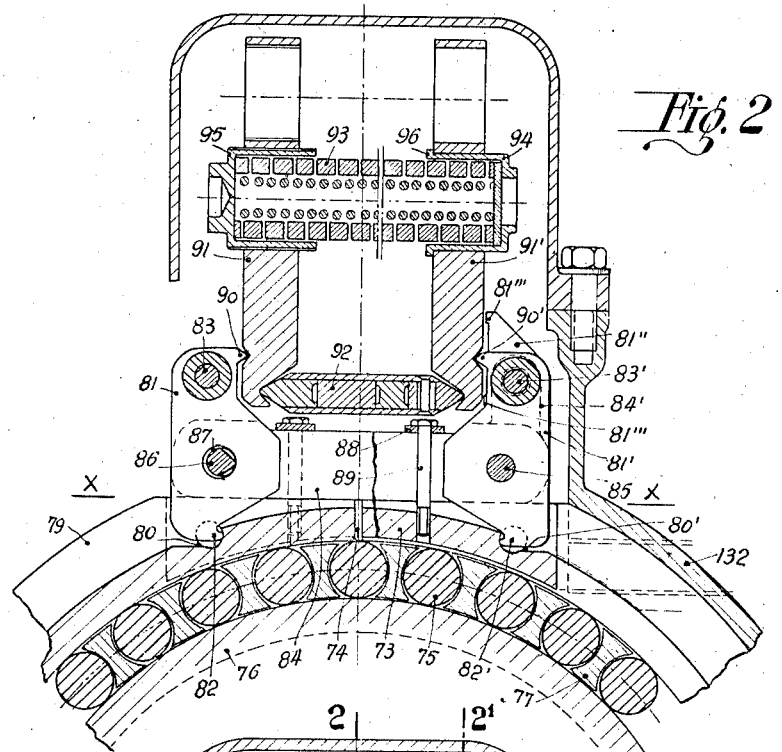
Figure 2 is a fragmentary enlarged section of a first embodiment, said section being made on line 2—2 of Fig. 3 in its left portion and on line 2'—2' of Fig. 3 in its right portion.

The ring 73 has peripheral grooves 78 on its outer surface, leaving intermediate ribs 79 which are cut to a flat surface along a plane shown by line X—X in Figure 2, and adjacent to slot 74 in the said ribs and ring body, at the two sides of the said slot, are provided two holes 80—80' having their central lines lying in a plane which is tangent or secant with respect to the cylindrical surface of the roller track of ring 73.

In grooves 78 of the ring 73 and at opposite sides with respect to slot 74, are arranged plates 81—81' having noses 82—82' engaging the seats provided by the cooperating holes 80—80' in the ring body; the sets of plates 81—81' engaged with either hole 80—80' are interconnected by a transverse bolt 83—83', respectively.

The two sets of plates 81—81' are interconnected by means of a series of ties 84 arranged intermediate the plates of each set and which bear on the planed surface X—X of ribs 79; the said ties 84 are clamped on the ring 73 by means of transverse bars 88 fastened on the ring 73 by means of screws 89, this interconnection does not affect the deformations of ring 73 under the action of its energizing device owing to flexibility of screws 89 and to small amplitude of said deformations.

Other means may be provided for clamping said ties and plate sets on ring 73, say parts engaging ring seats 80—80,' and bolts 85—86 interconnecting the plates of each set, as hereinafter described.

For the purpose of restricting the oscillation of set of plates 81' one of said ties 84 may have an extension 84' (Fig. 2) embracing bolt 83' and thus confining the motion of said plate set.

The plates 81' are connected with ties 84 by means of bolt 85 while plates 81 are connected with said ties by means of a knife-edge transverse stem 86 which is firmly engaged in holes of ties 84 and passes loosely through large holes 87 of said plates 81, its knife edge engaging the surface of the said plate holes and acting as fulcrum for said plates.

The plates of said sets engage by their upper noses 90—90' plate arms 91—91' which are fulcrumed on an intermediate member 92 hereinafter described, and are actuated or energized by springs 93 having adjustable and measurable action, each held in position by means of caps 94—95; caps 94 are each loose in a seat of plate-arm 91' on which they abut by means of collar 96, and each of caps 95 is screwed in a seat of plate arm 91 for the spring adjustment; of course a suitable number of springs similar to 93 are used, each having its ends engaged in caps 94—95 as shown in Figure 3.

Of course any other arrangement of springs or any other energizing means as a pressure cylinder or the like may be used for actuating plate-arms 91—91'.

The outward action of springs 93 or equivalent means causes the plate-arms 91—91' to swing away from each other around their fulcra on the intermediate member 92 and therefore the upper ends of plates 81 are caused to swing outwardly around their fulcrum 86 which is connected by means of ties 84 with the bolt 85 on which are pivoted plates 81' which in turn engage by their lower noses 82' the ring seat 80' and by their upper noses 90' abut on the plate arm 91'; said lower noses 82—82' of said plates 81—81' thus exert on the ends of the split ring 73 an inward action forcing said ring on the satellite rollers 75 and producing the adhesion of said satellite rollers on the tracks of ring 73 and central rim 76.

To prevent plate-arms 91—91' from floating on the noses 90—90' on which they are abutting, one of the plates 81' pivoted on bolt 85 and therefore connected by ties 84 and screws 89 with ring 73, is extended as shown in 81'' and has two abutments 81''' which are at a very short distance from opposite plate-arms 91' at opposite sides with respect to the fulcrum nose 90'; the respective displacements between plate arm 91' and set of plates 81' are thus restricted the set of plates 81' being held in position with respect to ties 84 and ring 73 by means of the bolt 83' and extension 84' of one of said ties 84.

For the purpose of compensating for inaccuracies, particularly with respect to parallelism of holes 80—80' providing the seats engaged by noses 82—82' of plates 81—81', or generally speaking for securing an even and uniform distribution of the pressure of adhesion on the entire extent of the contact lines of satellite rollers 75 on tracks of ring 73 and rim 76 as required for obtaining a correct operation of said rollers and preventing objectionable end thrusts of the same rollers, the member 92 on which the plate arms 91—91' are fulcrumed and which acts as a strut, is arranged to provide for adjustment of the respective distance and direction of its knife edges on which plate arms 91—91' are fulcrumed.

Figure 5:
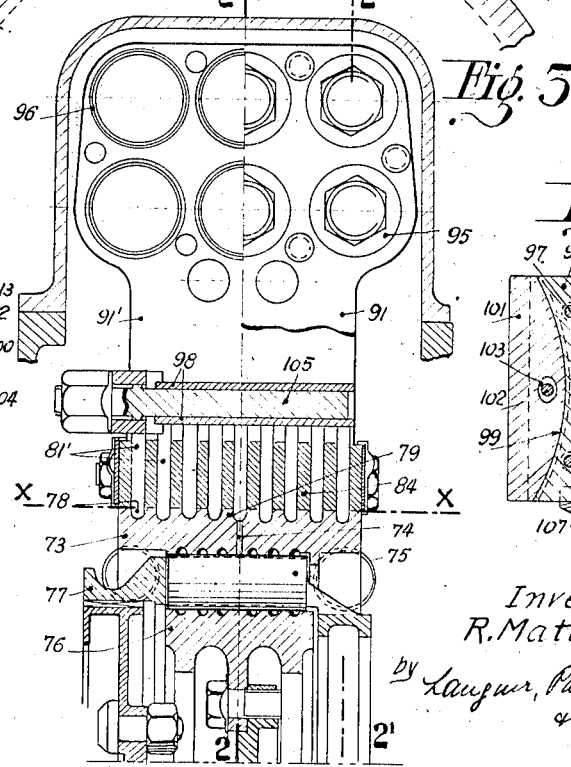
Figure 5 is a horizontal section of the detail shown in Figure 4.
Figure 6:
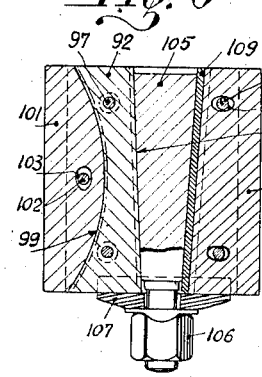
Figure 6 is a horizontal section of a modification.
Figure 4:
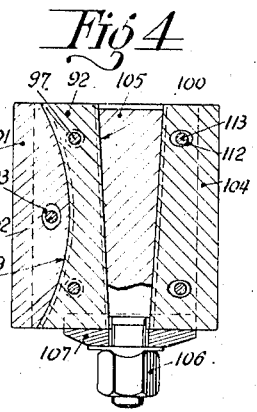
Figure 4 is a horizontal section of a detail.

In the construction illustrated by way of example in Figures 4 and 5, said strut comprises a body 92 fastened by means of rivets 97 on two side plates 98, and said body has a cylindrical surface 99 on one side, while on its opposite side 100 it is flat and sloping; on the cylindrical surface 99 of body 92 rests a segment-shaped member 101 which provides a fulcrum knife and is loosely embraced by plates 98 between which it is loosely held by a pin 102 freely passing through an opening 103. The other fulcrum knife is provided by a sloping part 104 which is loosely engaged between plates 98 by means of holes 112 and pins 113; intermediate said body 92 and part 104 is arranged a wedge 105 acted on by a nut 106 which bears on a transverse member 107 engaging the parts 92—104.

As well understood, at the time of mounting the parts the loose segment member 101 takes up by itself the required direction by which the actual contact of plate arms 91—91' along the whole length of the fulcrum-knives of parts 101—104 is obtained while by the manipulation of nut 106 the distance between the lines of contact of said fulcrum knives may be adjusted and thus the inaccuracies, wear or play of parts, and so on, may be compensated for, an even action on the whole extent of the ring 73 and therefore on the whole extent of contact lines of rollers 75 being obtained.

In the middle portion of the contacting surfaces of parts 101—92 105—104 longitudinal recesses 108 are provided to cause said parts to contact with each other along the edges of their contacting surfaces at the maximum possible distance from their middle line, in order to prevent them from swinging with respect to each other and provide a firm abutment of the parts.

In order to provide for a more extensive adjustment of the distance between contact lines of knives 101—104 without giving a too high inclination to slope of the adjusting wedge 105, and to provide for compensation of inaccuracies, it is useful to insert a removable pad 109 between parts 105 and 104; by inserting a pad having an appropriate thickness the coarse adjustment of the parts may be made, while the fine or correct adjustment may be made by means of nut 106 and wedge 105.

Of course the adjustment of distance and inclination of fulcruming lines of the members of the lever device 91—91′ 92—81 81′—85 86—84 may be effected in register with either of or a plurality of fulcra of the device, and if desired in different positions.

Of course in the above described constructions and, generally speaking, in all constructions of the present invention, suitable self-adjusting bearing means, as pivot-pins, balls, knives or the like may be used instead of the described cylindrical bearing surfaces.

Figures 8 and 9 illustrate a modification in which the adjustable parts are arranged on the plate-arms instead of being located in the intermediate fulcruming strut member.

In this embodiment plate arm 91″ has a cylindrical seat 109′ in which is arranged a segment 110 having in its straight edge a recess intended to receive the fulcruming edge of part 92′; the opposite edge of this part is sloping and contacts with a wedge member 105 engaged between side plates 98 carried by part 92′ and having a knife edge entering a straight recess 111 of the plate arm 91‴; the nut 106 bearing on abutment part 107 provides for shifting wedge 105 and thus adjusting the distance between fulcrum lines of plate-arms and intermediate strut.

In the embodiment of Figs. 10, 11, 12 and 13 the ends of the split ring 73 at the sides of its slot 74 are provided with seats 80—80′ arranged at the sides of the intermediate slot 74, the action line of the pressure regulating device on said ends being thus secant with respect to track provided on ring 73.

Said seats 80—80′ are engaged by noses 82—82′ of levers 114—114′ which act directly on the ring ends and are fulcrumed on knives 115—116 while on their upper ends they are engaged by outwardly acting means not shown, as springs, lever gears, or the like, to force the ring on the satellite rollers.

The levers 114—114′ are held in position by means of a frame 117 seated on the ring 73 in such a manner as to embrace the portions of the same comprising slot 74. Said frame 117 has on its lower surface a recess 118 in which are located the annular outer ribs 122 of ring 73.

In one end of the frame 117 is provided a cylindrical seat 119 connected with a square opening 120 while its opposed end has a large screw 121 screwed therein.

In the cylindrical seat 119, whose central line lies in the midddle plane of the ring 73 and is perpendicular to the line connecting the points of action of the noses 82, 82′, is seated a part 123 having a cylindrical surface and provided with the transverse knife 115 and two abutments 124—125 parallel with said knife and lying at the opposite sides with respect to it, to restrict the swinging movements of arm 114 with respect to part 123, for the purpose described in connection with Figures 2 and 3.

At the opposite end of the opening 120 is arranged a part 126 engaged by the end of the screw 121 and providing a cylindrical seat 127 similar to seat 119; in said seat 127 is engaged a cylindrical surface member 128 in which a knife 116 is provided.

Instead of said cylindrical bearing surfaces, other suitable self-adjusting supporting members or means as pivot pins, balls, knives or the like may be used.

Levers 114 and 114′ are located with play in the opening 120 in order to be able of a free adjustment within the same.

The part 123 is engaged in the frame 117 by means of screws 130 and a plate 129 bearing on the flange 131 of said part.

By this arrangement the lever device is firmly fastened on the ring by effect of the engagement of noses 82—82′ of levers 114—114′ in respective seats 80—80′ and of notches of levers 114—114′ by knives 115—116, carried by parts 123 and 128 which are engaged in the frame 117; on the other hand said frame bears on the ring by its recessed portion 118 and by its sides it acts to hold in position and guide the ends of the split ring 73 (Figs. 12 and 13).

The frame 117 may also be a part of the casing 132 enclosing the planetary gear.

The levers 114—114′ are adapted to adjust themselves in accordance with the possible respective inclination or lack of parallelism of seats 80—80′ because fulcruming parts 123 and 128 may rotate in the respective seats, while the support provided by knives 115—116 provides for compensating for inaccuracies due to lack of parallelism of axes of seats 127 and 119; thus an evenly distributed action on the entire extent of contact lines of satellite rollers and cooperating tracks is obtained.

Of course the present invention comprises all modifications of the described constructions and arrangements lying within the following claims, and it is only confined by appended claims.

What I claim as my invention and desire to secure by United States Letters Patent is:—

1. A planetary gear comprising a rim, a split ring, satellite rollers intermediate said rim and ring, a carrier for said rollers, means comprising levers and acting on the ends of said split ring to force it against said rollers and fulcrum means for two of said levers, said fulcrum means comprising means for adjustment of respective directions of fulcruming lines of said levers on said fulcrum means.

2. A planetary gear comprising a rim, a split ring, satellite rollers intermediate said rim and ring, a carrier for said rollers, means comprising levers and acting on the ends of said split ring to force it against said rollers and fulcrum means for two of said levers, said fulcrum means comprising means for self adjustment of respective directions of fulcruming lines of said levers on said fulcrum means.

3. A planetary gear comprising a rim, a split ring, satellite rollers intermediate said rim and ring, a carrier for said rollers, means comprising levers and acting on the ends of said split ring to force it against said rollers and fulcrum means for two of said levers, said fulcrum means comprising means for adjustment of respective distance and direction of the fulcruming lines of said levers on said fulcrum means.

4. A planetary gear comprising a rim, a split ring, satellite rollers intermediate said rim and ring, a carrier for said rollers, a lever device comprising two arm-members acting on the ends of said split ring to force it against said rollers, a fulcrum member for said arm-members comprising means for adjustment of respective distance and direction of fulcruming lines of said arm-members on said fulcrum member, and means for energizing said lever device.

5. A planetary gear comprising a rim, a split ring, satellite rollers intermediate said rim and ring, a carrier for said rollers, a lever device comprising two arm-members, a fulcrum member for said arm members comprising means for adjustment of respective distance and direction of fulcruming lines of said arm-members on said fulcrum member, reversing means intermediate said arm-members and split ring ends to force said split ring on said rollers, and means for energizing said lever device.

6. A planetary gear comprising a rim, a split ring, satellite rollers intermediate said rim and ring, a carrier for said rollers, a lever device comprising two arm-members, a fulcrum member for said arm-members comprising means for adjusting the respective distance and direction of fulcruming lines of said arm-members on said fulcrum member, reversing means intermediate said arm members and split ring ends to force said split ring on said rollers and means for energizing said lever device each of said reversing means comprising a set of swinging plates having one end engaged with one of said arm-members and their other end engaged in a seat of said ends of said split ring, fulcrum and connecting members for said plate sets and tie means interconnecting said fulcrum and connecting members.

7. A planetary gear comprising a rim, a split ring, satellite rollers intermediate said rim and ring, a carrier for said rollers, a lever device comprising two arm-members, a fulcrum member for said arm-members comprising means for adjustment of respective distance and direction of fulcruming lines of said arm members on said fulcrum member, reversing means intermediate said arm members and split ring ends to force said split ring on said rollers, means for energizing said lever device, each of said reversing means comprising a set of swinging plates having one of their ends engaged with one of said arms and their other end engaged in a seat of said ends of said split ring, fulcrum and connecting members for said plate sets, tie means interconnecting said fulcrum and connecting members and means engaging said tie means and fulcrum and connecting members with said split ring.

8. A planetary gear comprising a rim, a split ring, satellite rollers intermediate said rim and ring, a carrier for said rollers, a lever device comprising two arm-members, a fulcrum member for said arm-members comprising means for adjusting the respective distance and direction of fulcruming lines of said arm-members on said fulcrum member, reversing means intermediate said arm-members and split ring ends to force said split ring on said rollers, means for energizing said lever device, each of said reversing means comprising a set of swinging plates having one of their ends engaged with one of said arms and their other end engaged in a seat of said ends of said split ring, a fulcrum member for one of said plate sets, a connecting member for the other one of said plate sets, means interconnecting said fulcrum and connecting members and means for restricting the respective floating motion of the second named plate set and its associate arm-member.

9. A planetary gear comprising a rim, a split ring, satellite rollers intermediate said rim and ring, a carrier for said rollers, a lever device comprising two arm-members, a fulcrum member for said arm members comprising means for adjusting the respective distance and direction of fulcruming lines of said arm-members on said fulcrum member, reversing means intermediate said arm-members and split ring ends to force said split ring on said rollers, means for energizing said lever device, each of said reversing means comprising a set of swinging plates having one of their ends engaged with one of said arms and their other end engaged in a seat of said ends of said split ring, a fulcrum member for one of said plate sets, a connecting member for the other one of said plate sets, means interconnecting said fulcrum and connecting members and an extension on one of the plates of second named set having abutments for engagement with its associate arm member to restrict the respective floating motion of said second named plate set and associate arm member.

10. A planetary gear comprising a rim, a split ring, satellite rollers intermediate said rim and ring, a carrier for said rollers, means comprising levers and acting on the ends of said split ring to force it against said rollers, the line of action on said split ring ends lying between the centre of said ring and a line tangent to the track of said split ring for said rollers, and a fulcrum member for two of said levers, said fulcrum member comprising means for adjustment of respective distance and direction of fulcruming lines of said levers on said fulcrum member.

11. A planetary gear comprising a rim, a split ring, satellite rollers intermediate said rim and ring, a carrier for said rollers, means comprising levers and acting on the ends of said split ring to force it against said rollers and fulcrum means for two of said levers, said fulcrum means comprising a part adapted to swing in the plane lying through fulcruming lines of said levers and a part adapted to be moved in said plane in a transverse direction with respect to said fulcruming lines, and means for adjustment of the last named part.

12. A planetary gear comprising a rim, a split ring, satellite rollers intermediate said rim and ring, a carrier for said rollers, means comprising levers and acting on the ends of said split ring to force it against said rollers and fulcrum means for two of said levers, said fulcrum means comprising a part having a cylindrical-surface portion seated in a cylindrical seat of said means to swing in the plane lying through fulcruming lines of said levers, and a part adapted to be moved in said plane in a transverse direction with respect to said fulcruming lines, and means for adjusting the last named part.

13. A planetary gear comprising a rim, a split ring, satellite rollers intermediate said rim and ring, a carrier for said rollers, means comprising levers and acting on the ends of said split ring to force it against said rollers and fulcrum means for two of said levers, said fulcrum means comprising a part adapted to swing in a plane lying through fulcruming lines of said parts and a part adapted to be moved in said plane in a transverse direction with respect to said fulcruming lines, a wedge member cooperating with last named part and a screw member for actuation of said wedge member.

14. A planetary gear comprising a rim, a split ring, satellite rollers intermediate said rim and ring, a carrier for said rollers, means comprising levers and acting on the ends of said split ring to force it against said rollers and fulcrum means for two parts of said lever device, said fulcrum means comprising a body portion having side contact surfaces, a part having a side surface contacting with one of said side surfaces of said body and adapted to swing in a plane lying through the fulcruming lines of said parts, and a part adapted to slide along the other side surface of said body, said contact surface having slots in their intermediate portions to cause said parts and body to contact together along the edges of their contact surfaces.

15. A planetary gear comprising a rim, a split ring, satellite rollers intermediate said rim and ring, a carrier for said rollers, means comprising levers and acting on the ends of said split ring to force it against said rollers and a fulcrum means for two of said levers, said fulcrum means comprising a part adapted to swing in a plane lying through fulcruming lines of said levers and a part adapted to be moved in said plane in a transverse direction with respect to said fulcruming lines, wedge means cooperating with last named part, a removable pad cooperating with said last named part and wedge means and a screw member for actuation of said wedge means.

16. A planetary gear comprising a rim, a split ring, rollers intermediate said rim and ring and running on tracks of the same, arms engaging the ends of said ring to force it on said rollers, means for energizing said arms, a frame member seated on said ring and fulcruming means for said arms, said fulcruming means being self-adjustable in said frame member.

17. A planetary gear comprising a rim, a split ring, rollers intermediate said rim and ring and running on tracks of the same, arms engaging the ends of said ring to force it on said rollers, means for energizing said arms, a frame member seated on said ring and fulcruming means for said arms, said fulcruming means being adjustable and shiftable in said frame, and means for shifting said shiftable means.

18. A planetary gear comprising a rim, a split ring, rollers intermediate said rim and ring and running on tracks of the same, arms engaging the ends of said ring to force it on said rollers, means for energizing said arms, a frame member having recesses, ribs on said ring for engaging said recesses of the frame member, and fulcruming means for said arms, said fulcruming means being adjustable and shiftable in said frame, and means for shifting said shiftable means.

19. A planetary gear comprising a rim, a split ring, rollers intermediate said rim and ring and running on tracks of the same, arms engaging the ends of said ring to force it on said rollers, means for energizing said arms, a frame member seated on said ring, a member swinging in a cylindrical seat of said frame member and having a fulcrum for one of said arms, a part having a cylindrical seat and adjustable in and along said frame, means for adjusting the position of the last named part in said frame, and a part having a cylindrical surface swingingly seated in said adjustable part seat and providing a fulcrum for the other one of said arms.

20. A planetary gear comprising a rim, a split ring, rollers intermediate said rim and ring and running on tracks of the same, arms engaging the ends of said ring to force it on said rollers, means for energizing said arms, a frame member seated on said ring and fulcruming means for said arms, said fulcruming means being adjustable and shiftable in said frame member and said frame member being engaged in position on said ring by cooperation of said arms and ring ends and fulcruming means.

21. A planetary gear comprising a rim, a split ring, rollers intermediate said rim and ring and running on tracks of the same, arms engaging the ends of said ring to force it on said rollers, means for energizing said arms, a frame member seated on said ring, fulcruming means for said arms mounted in an adjustable and shiftable manner in said frame member and abutments on one of said fulcruming parts for engagement with its associate arm to restrict the respective motion of said frame and arm.

22. A planetary gear comprising a rim, a split ring, rollers intermediate said rim and ring and running on tracks of the same, arms engaging the ends of said ring to force it on said rollers, means for energizing said arms, a frame member seated on said ring and comprising sides acting to guide the ring ends adjacent to ring slot, and fulcruming means for said arms said fulcruming means being adjustable and shiftable in said frame member.

23. A planetary gear comprising a rim, a split ring, satellite rollers intermediate said rim and ring, a carrier for said rollers, means comprising levers symmetrical with respect to the slot of said split ring for producing on the ends of said split ring an adjustable and measurable action forcing said ring on said rollers, means for energizing said levers, fulcrum means for two symmetrical levers of said lever means and means on said fulcrum means for self adjustment of the directions of fulcruming lines of said levers on said fulcrum means.

24. A planetary gear comprising a rim, a split ring, satellite rollers intermediate said rim and ring, a carrier for said rollers, a lever device comprising two arm-members, a fulcrum member for said arm-members comprising means for adjusting the respective distance and direction of fulcruming lines of said arm-members on said fulcrum member, reversing means intermediate said arm-members and split ring ends to force said split ring on said rollers, means for energizing said lever device, each of said reversing means comprising a set of swinging plates having one of their ends engaged with one of said arms and their other end engaged in a seat of said ends of said split ring, a fulcrum member for one of said plate sets, a fulcrum member and a connecting member for the other one of said plate sets, means interconnecting said first named plate-set fulcrum-member with said fulcrum member of said second named plate-set, one of said interconnecting members engaging said connecting member of said second named plate-set, and an extension on one of the plates of said second-named set said extension having abutments for engagement with the arm-member associate with said plate set to restrict the respective floating motion of said plate sets and associate arm-members.

In testimony whereof I have signed my name to this specification.

RAFFAELE MATTEUCCI.